(12) United States Patent  (10) Patent No.: US 7,980,775 B2
Shimizu et al.  (45) Date of Patent: Jul. 19, 2011

(54) MOUNTING STRUCTURE FOR SUPPORT SHAFT AND IMAGE GENERATING APPARATUS

(75) Inventors: Daisuke Shimizu, Daito (JP); Daisuke Takasaka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 822 days.

(21) Appl. No.: 11/968,706

(22) Filed: Jan. 3, 2008

(65) Prior Publication Data

US 2008/0168918 A1  Jul. 17, 2008

(30) Foreign Application Priority Data

Jan. 12, 2007  (JP) ................................. 2007-004004

(51) Int. Cl.
   *B41J 29/02* (2006.01)
(52) U.S. Cl. ...................................... 400/691; 400/694
(58) Field of Classification Search .................. 400/691, 400/694
   See application file for complete search history.

(56) References Cited

U.S. PATENT DOCUMENTS

| 5,101,757 | A | * | 4/1992 | Schumacher | .................. | 118/46 |
| 5,174,003 | A | * | 12/1992 | Bitzer | .................. | 492/27 |
| 5,484,371 | A | * | 1/1996 | Gautier | .................. | 492/16 |
| 5,528,096 | A | * | 6/1996 | Orii et al. | .................. | 310/237 |
| 5,537,927 | A | * | 7/1996 | Rogovein et al. | .................. | 101/485 |
| 7,050,738 | B2 | * | 5/2006 | Amanai | .................. | 399/111 |
| 7,270,494 | B2 | * | 9/2007 | Silverbrook et al. | .................. | 400/693 |
| 2005/0141948 | A1 | * | 6/2005 | Sawai | .................. | 400/691 |

FOREIGN PATENT DOCUMENTS

| JP | 5-168191 A | 7/1993 |
| JP | 5-281848 A | 10/1993 |
| JP | 6-58376 A | 3/1994 |
| JP | 6-153444 A | 5/1994 |
| JP | 8-42537 A | 2/1996 |
| JP | 2529981 Y2 | 12/1996 |
| JP | 2000-346043 A | 12/2000 |
| JP | 3812643 B2 | 6/2006 |

OTHER PUBLICATIONS

Japanese Office Action dated Nov. 25, 2008 w/English translation (six (6) pages).

* cited by examiner

*Primary Examiner* — Anthony H. Nguyen
(74) *Attorney, Agent, or Firm* — Crowell & Moring LLP

(57) ABSTRACT

This image generating apparatus includes a side plate, mounted on a first side surface of a chassis provided with a print portion, integrally including a bearing, a bracket member mounted on the side plate and a support shaft arranged between the side plate and the bracket member for rotatably supporting a gear member, while a first end of the support shaft is fixedly mounted on the bracket member, and a second end of the support shaft includes a side end surface brought into line contact with the bearing of the side plate.

16 Claims, 7 Drawing Sheets

MOUNTING STRUCTURE FOR SUPPORT SHAFT AND IMAGE GENERATING APPARATUS

BACKGROUND OF THE INVENTION

1. Field of the Invention

The present invention relates to a mounting structure for a support shaft and an image generating apparatus, and more particularly, it relates to a mounting structure for a support shaft and an image generating apparatus each including a bearing.

2. Description of the Background Art

A mounting structure for a support shaft and an image generating apparatus each including a bearing for supporting a support shaft are known in general, as disclosed in Japanese Patent Laying-Open No. 05-168191 (1993), Japanese Utility Model Registration No. 2529981, Japanese Patent Laying-Open No. 2000-346043, Japanese Patent Laying-Open No. 08-042537 (1996), Japanese Patent Laying-Open No. 05-281848 (1993) and Japanese Patent No. 3812643, for example.

The aforementioned Japanese Patent Laying-Open No. 05-168191 discloses a bearing apparatus comprising a shaft (support shaft), a bearing body (bearing), a lower bearing support so arranged as to cover the bearing body and an upper bearing support so arranged as to cover the bearing body and the lower bearing support and so formed as to mesh with the lower bearing support. In this bearing apparatus described in Japanese Patent Laying-Open No. 05-168191, the upper bearing support meshing with the lower bearing support is so rotated and tightened toward the shaft as to clamp the lower bearing support thereby clamping the bearing body with the lower bearing support and fixing the shaft.

The aforementioned Japanese Utility Model Registration No. 2529981 discloses a shaft supporting structure comprising a rotating shaft (support shaft) including a tapered surface (chamfer), a ring-shaped outer block (bearing) and bearing balls. In the shaft supporting structure described in Japanese Utility Model Registration No. 2529981, the bearing balls are so arranged as to come into contact with the tapered surface of the rotating shaft and the inner side surface of the outer block.

The aforementioned Japanese Patent Laying-Open No. 2000-346043 discloses a rotating shaft support mechanism comprising a rotating shaft (support shaft) including a convex driving force transmitting portion provided on an end thereof and a rotating shaft support including a concave cut portion (bearing) provided on an end thereof. In the rotating shaft support mechanism described in Japanese Patent Laying-Open No. 2000-346043, the convex driving force transmitting portion of the rotating shaft is inserted into the concave cut portion of the rotating shaft support.

The aforementioned Japanese Patent Laying-Open No. 08-042537 discloses a member position control apparatus comprising a rotating shaft (support shaft) provided with a tapered surface (chamfer), an insertion member (bearing) and a bush nut. In the member position control apparatus described in Japanese Patent Laying-Open No. 08-042537, the bush nut comes into contact with the insertion member (bearing) and the tapered surface of the rotating shaft, thereby inhibiting the rotating shaft and the insertion member from backlash.

The aforementioned Japanese Patent Laying-Open No. 05-281848 discloses a developing apparatus (image generating apparatus) comprising a developing roller, two center shafts (support shafts) supporting both ends of the developing roller and two attachments. In the developing apparatus described in Japanese Patent Laying-Open No. 05-281848, the forward ends of the center shafts are in the form of triangular pyramids, while openings for receiving the center shafts are formed on both ends of the developing roller and tapered surfaces (contact portions) are formed inside the openings. The forward ends of the two center shafts support the tapered surfaces of the openings of the developing roller thereby supporting the developing roller, while the two attachments are pressed against both side shaft portions of the developing roller thereby inhibiting the developing roller from backlash.

The aforementioned Japanese Patent No. 3812643 discloses a transport follower roller mounting apparatus comprising a transport follower roller including shafts provided on both ends thereof and a bearing. In the transport follower roller mounting apparatus described in Japanese Patent No. 3812643, the bearing supports the shafts of the transport follower roller.

In the aforementioned bearing apparatus described in Japanese Patent Laying-Open No. 05-168191, however, the upper and lower bearing supports are provided independently of the bearing body (bearing) in order to fix the shaft, whereby the number of components is disadvantageously increased.

In the aforementioned shaft supporting structure described in Japanese Utility Model Registration No. 2529981, the bearing balls are provided independently of the ring-shaped outer block (bearing) in order to support the rotating shaft, whereby the number of components is disadvantageously increased.

In the aforementioned rotating shaft support mechanism described in Japanese Patent Laying-Open No. 2000-346043, the cut portion of the rotating shaft support is conceivably formed larger in size than the driving force transmitting portion of the rotating shaft in order to receive the driving force transmitting portion, whereby a clearance is formed between the driving force transmitting portion and the cut portion. Therefore, the rotating shaft disadvantageously causes backlash.

In the aforementioned member position control apparatus described in Japanese Patent Laying-Open No. 08-042537, the bush nut is provided independently of the insertion member (bearing) in order to inhibit the rotating shaft and the insertion member from backlash, whereby the number of components is disadvantageously increased.

In the aforementioned developing apparatus described in Japanese Patent Laying-Open No. 05-281848, the two attachments are provided independently of the two center shafts in order to suppress backlash resulting from rotation of the developing roller, whereby the number of components is disadvantageously increased.

In the aforementioned transport follower roller mounting apparatus described in Japanese Patent No. 3812643, a structure for supporting the shafts of the transport follower roller with the bearing is conceivably neither disclosed nor suggested, whereby the transport follower roller may disadvantageously cause backlash.

SUMMARY OF THE INVENTION

The present invention has been proposed in order to solve the aforementioned problems, and an object of the present invention is to provide an image generating apparatus and a mounting structure for a support shaft each capable of inhibiting a support shaft from backlash while suppressing increase in the number of components.

An image generating apparatus according to a first aspect of the present invention comprises a side plate, mounted on a first side surface of a chassis provided with a print portion, integrally including a bearing, a bracket member mounted on the side plate and a support shaft arranged between the side plate and the bracket member for rotatably supporting a gear member, while a first end of the support shaft is fixedly mounted on the bracket member, and a second end of the support shaft includes a side end surface brought into line contact with the bearing of the side plate.

In the image generating apparatus according to the first aspect, as hereinabove described, the first end of the support shaft rotatably supporting the gear member is fixedly mounted on the bracket member while the second end of the support shaft includes the side end surface brought into line contact with the bearing of the side plate so that the side end surface provided on the second end of the support shaft and the bearing closely come into line contact with each other, whereby the support shaft can be inhibited from backlash. Thus, the gear member supported by the support shaft can also be inhibited from backlash, whereby a printed image can be inhibited from disorder resulting from backlash of the gear member. The side end surface and the bearing are brought into contact with and fixed to each other on the second end of the support shaft, whereby the support shaft is easily detachable dissimilarly to a case where the same is press-fitted. Further, no member may be separately provided for inhibiting the support shaft from backlash, whereby the image generating apparatus can be inhibited from increase in the number of components.

In the aforementioned image generating apparatus according to the first aspect, the side end surface provided on the second end of the support shaft preferably has a chamfer, and the bearing of the side plate preferably includes a contact portion capable of coming into line contact with the chamfer of the support shaft. According to this structure, the chamfer of the support shaft is brought into line contact with the contact portion of the bearing, whereby the support shaft can be reliably inhibited from backlash.

In the aforementioned image generating apparatus according to the first aspect, the second end of the support shaft preferably further includes a bearing insertion portion having a prescribed outer diameter, the chamfer is preferably formed on the forward end of the bearing insertion portion, the bearing of the side plate preferably includes a first opening having an inner diameter larger than the outer diameter of the bearing insertion portion and a second opening having an inner diameter smaller than the outer diameter of the bearing insertion portion, and an end of the second opening closer to the first opening preferably constitutes the contact portion capable of coming into line contact with the chamfer. According to this structure, the bearing insertion portion is so inserted into the second opening through the first opening that the chamfer of the bearing insertion portion comes into contact with the contact portion constituted of the end of the second opening, whereby the support shaft can be easily positioned.

In the aforementioned image generating apparatus according to the first aspect, the depth of the second opening is preferably larger than the axial length of the chamfer of the support shaft. According to this structure, the chamfer of the support shaft can come into contact with the contact portion located on the opening end of the second opening without bringing the forward end of the support shaft into contact with the bottom surface of the second opening when the support shaft is inserted into the second opening through the first opening of the bearing, whereby the support shaft can be easily positioned.

In the aforementioned image generating apparatus according to the first aspect, the bearing of the side plate may be made of resin, the support shaft may be made of metal having larger rigidity than the bearing of resin, and the support shaft of metal may be mounted on the contact portion of the bearing of resin linearly in contact therewith.

In the aforementioned image generating apparatus provided with the support shaft including the side end surface having the chamfer, the chamfer of the support shaft preferably has a tapered shape inwardly inclined by a prescribed angle with respect to the side surface of the support shaft. According to this structure, the chamfer of the support shaft is so linearly formed that the same can be easily brought into line contact with the contact portion of the bearing.

In the aforementioned image generating apparatus provided with the bearing having the first and second openings, the outer diameter of the forward end of the bearing insertion portion provided on the support shaft is preferably smaller than the inner diameter of the second opening. According to this structure, the chamfer of the support shaft can come into contact with the contact portion located on the opening end of the second opening without bringing the forward end of the support shaft into contact with the side surface of the second opening when the support shaft is inserted into the second opening through the first opening of the bearing. Thus, the support shaft can be more easily positioned.

In the aforementioned image generating apparatus provided with the bearing having the first and second openings, the contact portion of the bearing is preferably provided between the first opening and the second opening, and preferably has an angular shape. According to this structure, the chamfer of the support shaft comes into contact with the angular contact portion when the support shaft is mounted on the bearing, whereby the chamfer of the support shaft and the contact portion of the bearing can be easily brought into line contact with each other.

In the aforementioned image generating apparatus according to the first aspect, the support shaft preferably further includes a support shaft body, the gear member is rotatably fitted to the support shaft body, and an end surface of the support shaft body closer to the bearing insertion portion and an end surface of the bearing opposite to the support shaft body are preferably at a prescribed interval not to come into contact with each other. According to this structure, the end surface of the support shaft body of the support shaft closer to the bearing insertion portion does not come into contact with the bearing when the support shaft is mounted on the bearing, whereby the chamfer of the support shaft can be brought into contact with the contact portion located on the opening end of the second opening. Thus, the support shaft can be more easily positioned.

In the aforementioned image generating apparatus according to the first aspect, the bracket member is preferably made of metal, and the first end of the support shaft is preferably fixedly mounted on the bracket member of metal by caulking. According to this structure, the support shaft can be strongly fixed to the bracket member by caulking.

An image generating apparatus according to a second aspect of the present invention comprises a side plate, mounted on a first side surface of a chassis provided with a print portion, integrally including a bearing, a bracket member mounted on the side plate and a support shaft arranged between the side plate and the bracket member for rotatably supporting a gear member, a first end of the support shaft is fixedly mounted on the bracket member, a second end of the support shaft includes a side end surface brought into line contact with the bearing of the side plate, the side end surface provided on the second end of the support shaft has a chamfer, the second end of the support shaft further includes a bearing insertion portion having a prescribed outer diameter while the chamfer is formed on the forward end of the bearing insertion portion, the bearing of the side plate includes a contact portion capable of coming into line contact with the chamfer of the support shaft, a first opening having an inner diameter larger than the outer diameter of the bearing insertion portion and a second opening having an inner diameter smaller than the outer diameter of the bearing insertion portion, an end of the second opening closer to the first opening constitutes the contact portion capable of coming into line contact with the chamfer, and the depth of the second opening is larger than the axial length of the chamfer of the support shaft.

In the image generating apparatus according to the second aspect, as hereinabove described, the first end of the support shaft rotatably supporting the gear member is fixedly mounted on the bracket member while the second end of the support shaft includes the side end surface brought into line contact with the bearing of the side plate so that the side end surface provided on the second end of the support shaft and the bearing closely come into line contact with each other, whereby the support shaft can be inhibited from backlash. Thus, the gear member supported by the support shaft can also be inhibited from backlash, whereby a printed image can be inhibited from disorder resulting from backlash of the gear member. The side end surface and the bearing are brought into contact with and fixed to each other on the second end of the support shaft, whereby the support shaft is easily detachable dissimilarly to a case where the same is press-fitted. Further, no member may be separately provided for inhibiting the support shaft from backlash, whereby the image generating apparatus can be inhibited from increase in the number of components.

In the image generating apparatus according to the second aspect, further, the side end surface provided on the second end of the support shaft has the chamfer and the bearing of the side plate includes the contact portion capable of coming into line contact with the chamfer of the support shaft so that the chamfer of the support shaft is brought into line contact with the contact portion of the bearing, whereby the support shaft can be reliably inhibited from backlash. The second end of the support shaft further includes the bearing insertion portion having the prescribed outer diameter, the chamfer is formed on the forward end of the bearing insertion portion, the bearing of the side plate includes the first opening having the inner diameter larger than the outer diameter of the bearing insertion portion and the second opening having the inner diameter smaller than the outer diameter of the bearing insertion portion and the end of the second opening closer to the first opening constitutes the contact portion capable of coming into line contact with the chamfer so that the bearing insertion portion is so inserted into the second opening through the first opening that the chamfer of the bearing insertion portion comes into contact with the contact portion constituted of the end of the second opening, whereby the support shaft can be easily positioned. Further, the depth of the second opening is larger than the axial length of the chamfer of the support shaft so that the chamfer of the support shaft can come into contact with the contact portion located on the opening end of the second opening without bringing the forward end of the support shaft into contact with the bottom surface of the second opening when the support shaft is inserted into the second opening through the first opening of the bearing, whereby the support shaft can be more easily positioned.

In the aforementioned image generating apparatus according to the second aspect, the bearing of the side plate may be made of resin, the support shaft may be made of metal having larger rigidity than the bearing of resin, and the support shaft of metal may be mounted on the contact portion of the bearing of resin linearly in contact therewith.

In the aforementioned image generating apparatus according to the second aspect, the chamfer of the support shaft preferably has a tapered shape inwardly inclined by a prescribed angle with respect to the side surface of the support shaft. According to this structure, the chamfer of the support shaft is so linearly formed that the same can be easily brought into line contact with the contact portion of the bearing.

In the aforementioned image generating apparatus according to the second aspect, the outer diameter of the forward end of the bearing insertion portion provided on the support shaft is preferably smaller than the inner diameter of the second opening. According to this structure, the chamfer of the support shaft can come into contact with the contact portion located on the opening end of the second opening without bringing the forward end of the support shaft into contact with the side surface of the second opening when the support shaft is inserted into the second opening through the first opening of the bearing. Thus, the support shaft can be more easily positioned.

In the aforementioned image generating apparatus according to the second aspect, the contact portion of the bearing is preferably provided between the first opening and the second opening, and preferably has an angular shape. According to this structure, the chamfer of the support shaft comes into contact with the angular contact portion when the support shaft is mounted on the bearing, whereby the chamfer of the support shaft and the contact portion of the bearing can be easily brought into line contact with each other.

In the aforementioned image generating apparatus according to the second aspect, the support shaft preferably further includes a support shaft body, the gear member is rotatably fitted to the support shaft body, and an end surface of the support shaft body closer to the bearing insertion portion and an end surface of the bearing opposite to the support shaft body are preferably at a prescribed interval not to come into contact with each other. According to this structure, the end surface of the support shaft body of the support shaft closer to the bearing insertion portion does not come into contact with the bearing when the support shaft is mounted on the bearing, whereby the chamfer of the support shaft can be brought into contact with the contact portion located on the opening end of the second opening. Thus, the support shaft can be more easily positioned.

In the aforementioned image generating apparatus according to the second aspect, the bracket member is preferably made of metal, and the first end of the support shaft is preferably fixedly mounted on the bracket member of metal by caulking. According to this structure, the support shaft can be strongly fixed to the bracket member by caulking.

A mounting structure for a support shaft according to a third aspect of the present invention comprises a side plate, mounted on a first side surface of a chassis, integrally including a bearing, a bracket member mounted on the side plate and a support shaft arranged between the side plate and the bracket member for rotatably supporting a gear member, while a first end of the support shaft is fixedly mounted on the bracket member, and a second end of the support shaft includes a side end surface brought into line contact with the bearing of the side plate.

In the mounting structure for a support shaft according to the third aspect, as hereinabove described, the first end of the support shaft rotatably supporting the gear member is fixedly mounted on the bracket member while the second end of the support shaft includes the side end surface brought into line contact with the bearing of the side plate so that the side end surface provided on the second end of the support shaft and the bearing closely come into line contact with each other, whereby the support shaft can be inhibited from backlash. The side end surface and the bearing are brought into contact with and fixed to each other on the second end of the support shaft, whereby the support shaft is easily detachable dissimilarly to a case where the same is press-fitted. Further, no member may be separately provided for inhibiting the support shaft from backlash, whereby the mounting structure for a support shaft can be inhibited from increase in the number of components.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of a sublimatic printer 60 according to the embodiment of present invention is described with reference to FIGS. 1 to 8. According to this embodiment, the present invention is applied to the sublimatic printer 60 employed as an exemplary image generating apparatus.

Figure 1:
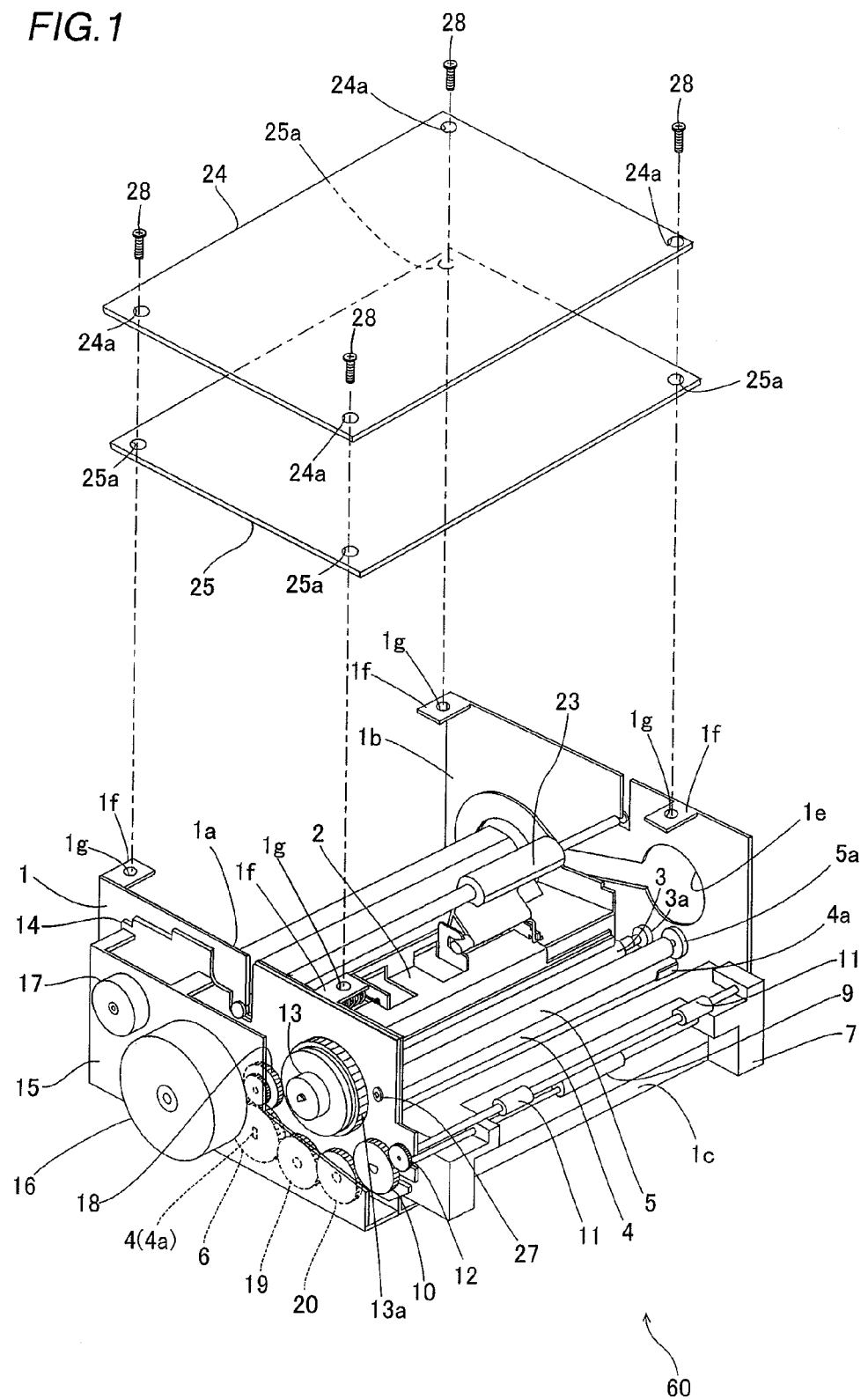
FIG. 1 is a perspective view showing the overall structure of a sublimatic printer according to an embodiment of the present invention.

The sublimatic printer 60 according to the embodiment of the present invention comprises a chassis 1 of metal, a print head 2 for printing, a platen roller 3 (see FIGS. 1 and 5) opposed to the print head 2, a feed roller 4 (see FIGS. 1 and 5) of metal, a press roller 5 (see FIGS. 1 and 5) for pressing the feed roller 4 with prescribed pressing force, a feed roller gear 6 (see FIGS. 2 and 6), a lower paper guide 7 (see FIGS. 1 and 5) of resin, an upper paper guide 8 (see FIG. 5) of resin, a paper feed roller 9 of rubber and a paper feed roller gear 10 (see FIGS. 2 and 6), as shown in FIG. 1.

The sublimatic printer 60 further comprises paper discharge rollers 11 of rubber, a paper discharge roller gear 12 (see FIGS. 2 and 6), a take-up reel 13 (see FIGS. 2 and 6), a side plate 14 (see FIG. 2) of resin, a motor bracket 15, a stepping motor 16 (see FIGS. 2 and 6) for transporting papers 41 (see FIG. 3) described later, another stepping motor 17 serving as a driving source for rotating the print head 2, a swingable swing gear 18 (see FIGS. 2 and 6), a plurality of intermediate gears 19 to 22 (see FIGS. 2 and 6), a press member 23 (see FIGS. 1 and 5) for pressing the print head 2, a wiring board 24 provided with a circuit portion (not shown) controlling operations of the sublimatic printer 60 and a housing 26 (see FIG. 3) storing the chassis 1 therein. The motor bracket 15 is an example of the "bracket member" in the present invention. The intermediate gear 22 is an example of the "gear member" in the present invention.

As shown in FIG. 1, the chassis 1 has first and second side surfaces 1a and 1b opposite to each other and a bottom surface 1c. Threaded holes 1d (see FIG. 2) receiving screws 27 for mounting the side plate 14 of resin are provided on the first side surface 1a (see FIG. 2) of the chassis 1. A receiving hole 1e for receiving an ink sheet cartridge 50 (see FIG. 3) is provided on the second side surface 1b (see FIG. 3) of the chassis 1. Pairs of mounting portions 1f for mounting the wiring board 24 are formed on the upper ends of the first and second side surfaces 1a and 1b of the chassis 1 respectively 1, while threaded holes 1g receiving screws 28 for fixing the wiring board 24 are formed on the four mounting portions 1f respectively. Paper sensors 29a and 29b (see FIG. 5) for detecting the forward and rear ends of each paper 41 respectively are provided on the bottom surface 1c of the chassis 1.

Two platen roller bearings 3a (see FIG. 4) are mounted on the first and second side surfaces 1a and 1b of the chassis 1 respectively, for rotatably supporting the platen roller 3. The feed roller 4 is rotatably supported by a feed roller bearing 4a (see FIG. 2) mounted on the chassis 1, while a first end of the feed roller 4 is mounted on the feed roller gear 6 through the first side surface 1a of the chassis 1 and the side plate 14 of resin. The press roller 5 is rotatably supported by a press roller bearing 5a (see FIG. 4). The feed roller 4 and the press roller 5 have a function of transporting the papers 41 described later in a paper feed direction (along arrow T1 in FIG. 5) or a paper discharge direction (along arrow U1 in FIG. 5) by rotating in a state holding each paper 41 therebetween, as shown in FIG. 5.

Figure 2:
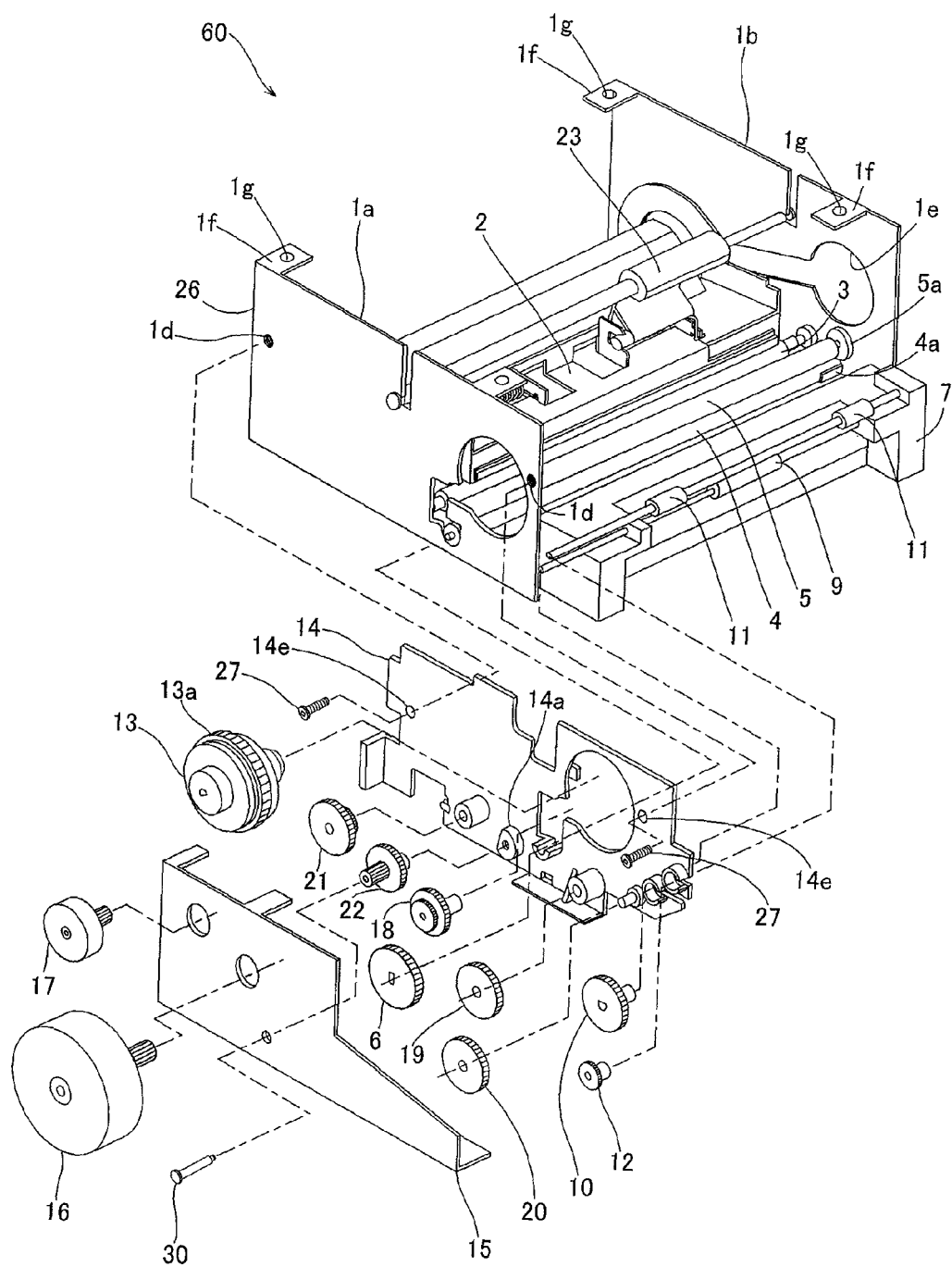
FIG. 2 is an exploded perspective view of the sublimatic printer according to the embodiment of the present invention shown in FIG. 1.

As shown in FIG. 2, the paper feed roller gear 10 is mounted on a first end of the paper feed roller 9 through the side plate 14 of resin and the first side surface 1a of the chassis 1. The paper feed roller 9 has a function of introducing the papers 41 into the chassis 1 (along arrow T1 in FIG. 5) from a paper feed cassette case 40 (see FIG. 3), as shown in FIG. 5.

Figure 5:
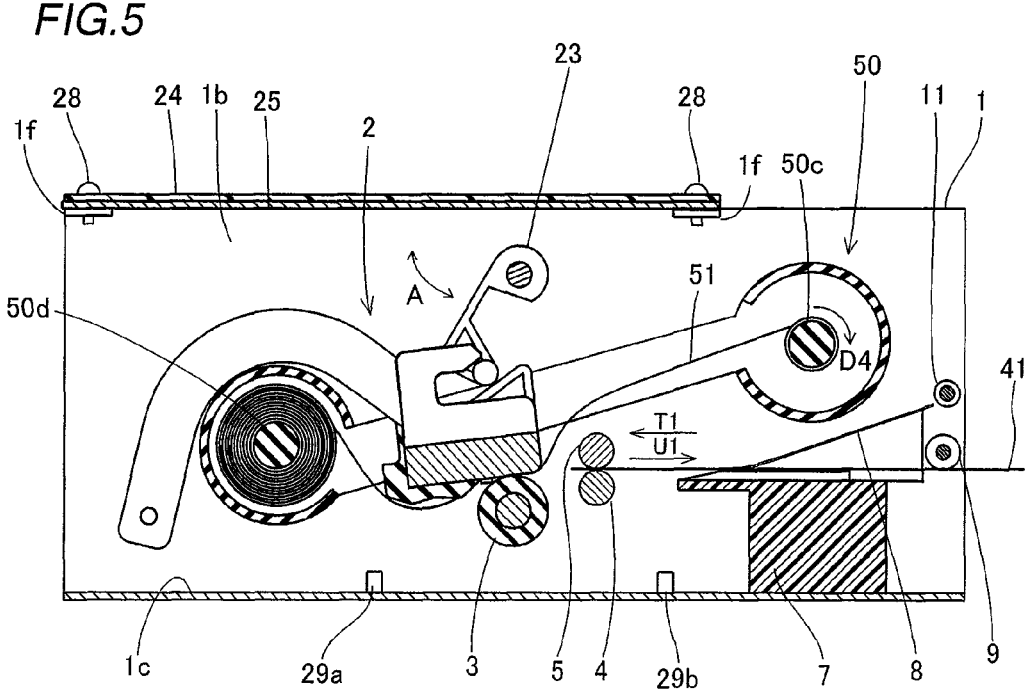
FIG. 5 is a sectional view of the sublimatic printer according to the embodiment of the present invention shown in FIG. 1.

The paper discharge droller gear 12 is mounted on first ends of the paper discharge rollers 11 through the side plate 14 of resin and the first side surface 1a of the chassis 1 similarly to the paper feed roller gear 10 as shown in FIG. 2, and has a function of discharging the papers 41 printed by the print head 2 from the chassis 1 (along arrow U1 in FIG. 5) as shown in FIG. 5.

Figure 6:
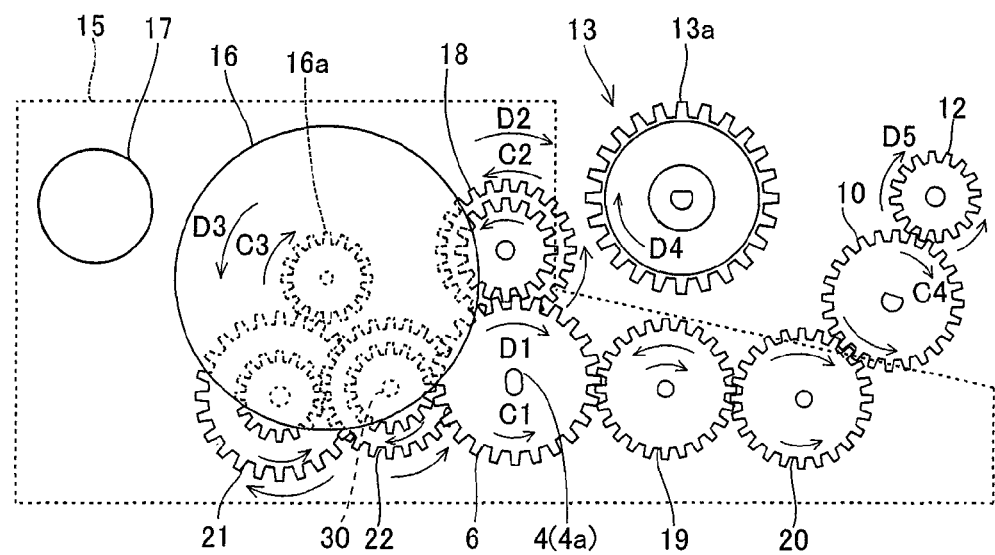
FIG. 6 illustrates the arrangement of gears included in the sublimatic printer according to the embodiment of the present invention shown in FIG. 1.

The take-up reel 13 (see FIGS. 2 and 6) is so formed as to engage with a take-up bobbin 50c arranged in a take-up portion 50a of the ink sheet cartridge 50 shown in FIG. 3 as described later thereby taking up an ink sheet 51 wound on the take-up bobbin 50c, as shown in FIG. 5. The gear portion 13a of the take-up reel 13 is so arranged as to mesh with the swing gear 18 upon swinging thereof, as shown in FIG. 6.

Figure 4:
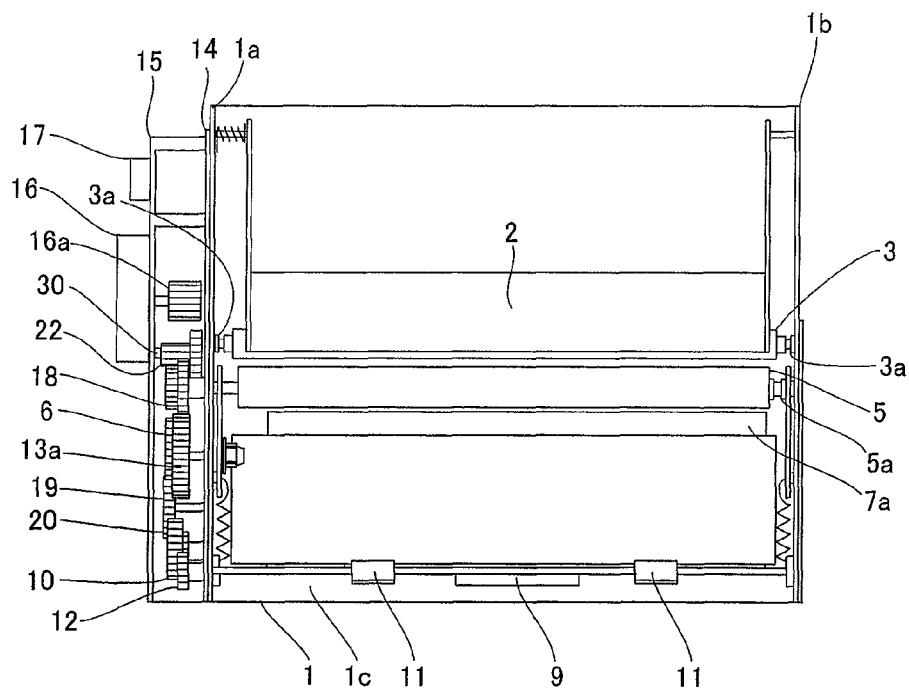
FIG. 4 is a plan view of the sublimatic printer according to the embodiment of the present invention shown in FIG. 1.

As shown in FIGS. 4 and 5, a motor gear 16a is mounted on the shaft portion of the stepping motor 16 mounted on the motor bracket 15. As shown in FIG. 6, the stepping motor 16 functions as a driving source for driving the gear portion 13a of the take-up reel 13, the paper feed roller gear 10, the paper discharge roller gear 12 and the feed roller gear 6. As shown in FIG. 1, the stepping motor 17 has a function of vertically rotating the print head 2 for pressing and separating the same against and from the platen roller 3. More specifically, the press member 23 is so driven by the stepping motor 17 as to rotate (along arrow A in FIG. 5) and engage with the print head 2 thereby pressing and separating the same against and from the platen roller 3, as shown in FIG. 5.

The intermediate gears 19 to 22 are mounted on the side plate 14 (see FIGS. 2 and 7) of resin in order to transmit the driving force of the stepping motor 16 to the feed roller gear 6, the paper feed roller gear 10 and the paper discharge roller gear 12, as shown in FIG. 2.

As shown in FIG. 2, the side plate 14 of resin is fixed by tightening the screws 27 inserted into two receiving holes 14e thereof to the threaded holes 1d provided on the first side surface 1a of the chassis 1, as described later.

According to this embodiment, a support shaft 30 of metal rotatably supporting the intermediate gear 22 is arranged between a bearing 14a integrally provided on the side plate 14 of resin and the motor bracket 15, as shown in FIG. 2.

Figure 7:
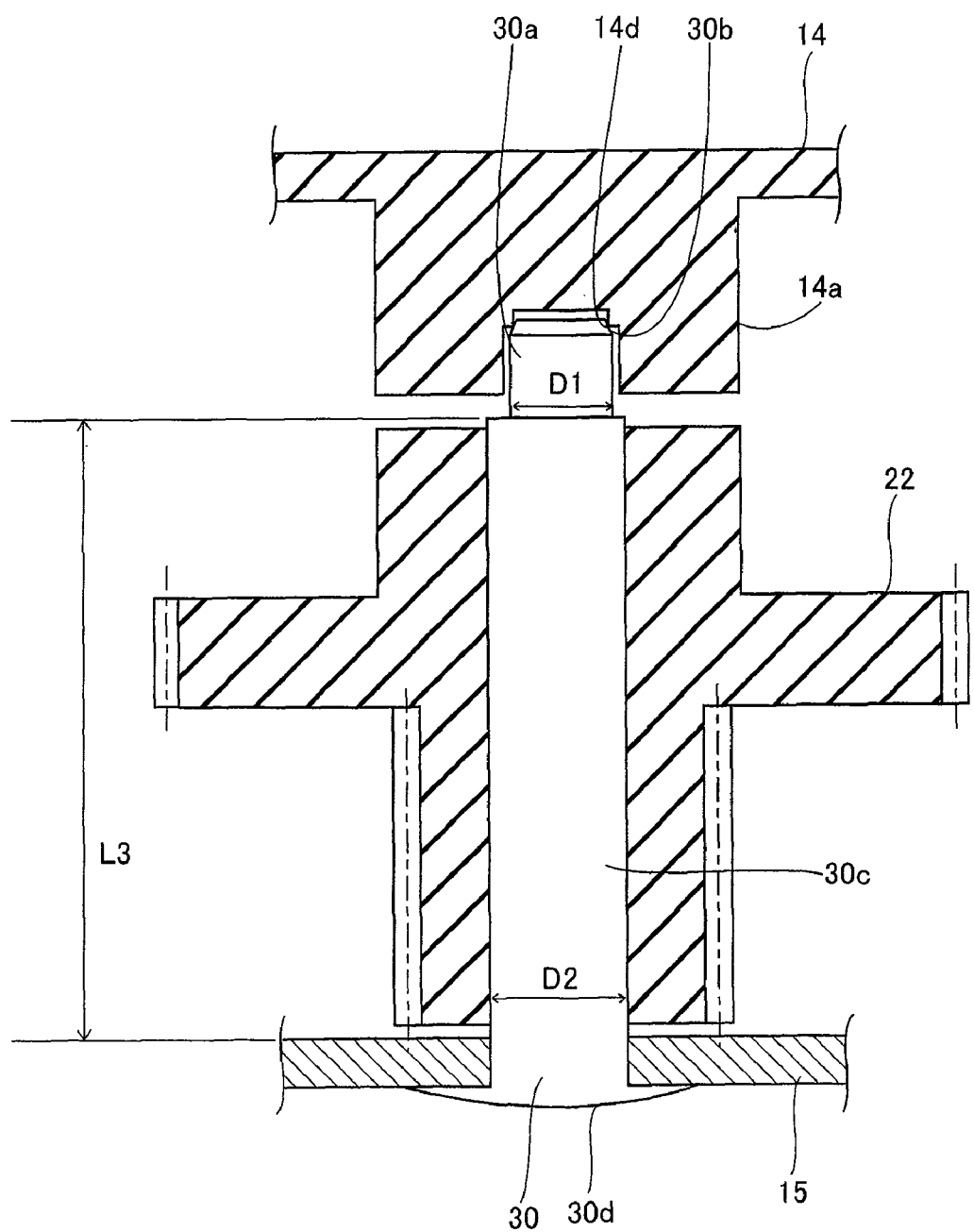
FIG. 7 is a sectional view of a portion, mounted with a support shaft, of the sublimatic printer according to the embodiment of the present invention shown in FIG. 1.
Figure 8:
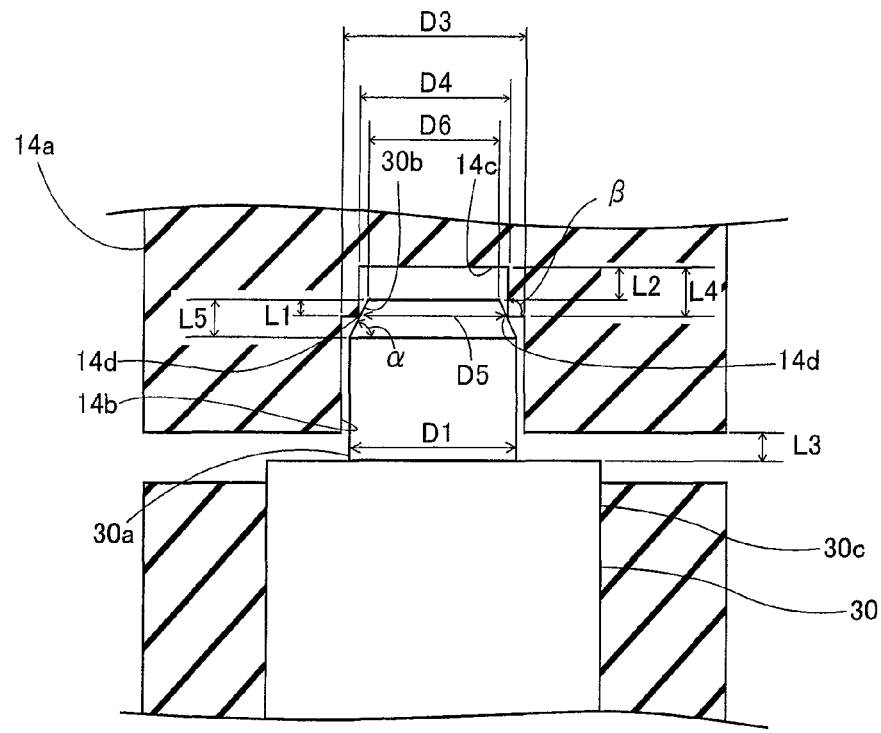
FIG. 8 is an enlarged sectional view showing a portion where the support shaft of the sublimatic printer according to the embodiment of the present invention shown in FIG. 1 is in contact with a bearing.

According to this embodiment, further, a bearing insertion portion 30a inserted into the bearing 14a (see FIG. 2) of the side plate 14 of metal is provided on the support shaft 30 of metal rotatably supporting the intermediate gear 22 (see FIG. 2) while a chamfer 30b is formed on a side end surface of the forward end of the bearing insertion portion 30a, as shown in FIGS. 7 and 8. The bearing insertion portion 30a is so formed that the diameter D1 thereof is smaller than the diameter D2 of a support shaft body 30c.

According to this embodiment, the bearing 14a of the side plate 14 of resin provided for supporting the support shaft 30 of metal is constituted of a first opening 14b having a first inner diameter D3, a second opening 14c having a second inner diameter D4, a contact portion 14d provided on an end of the second opening 14c closer to the first opening 14b and the screw receiving holes 14e (see FIG. 2) receiving the screws 27 for fixing the side plate 14 to the chassis 1, as shown in FIG. 8. The inner diameter D3 of the first opening 14c of the bearing 14a is larger than the diameter D1 of the bearing insertion portion 30a of the support shaft 30, while the inner diameter D4 of the second opening 14c of the bearing 14a is smaller than the diameter D1 of the bearing insertion portion 30a of the support shaft 30.

According to this embodiment, a first end 30d of the support shaft 30 of metal is fixed to the motor bracket 15 by caulking while the chamfer 30b provided on the second end of the support shaft 30 of metal is brought into line contact with the contact portion 14d of the bearing 14a provided on the side plate 14 of resin, as shown in FIG. 7. More specifically, the diameter D1 of the bearing insertion portion 30a is smaller than the inner diameter D3 of the first opening 14b of the bearing 14a and larger than the inner diameter D4 of the second opening 14c, whereby the chamfer 30b is brought into contact with the contact portion 14d on the position (D4=D5) where the diameter D5 of the chamfer 30b is equal to the inner diameter D4 of the second opening 14c, as shown in FIG. 8. In other words, the support shaft 30 is inserted into the second opening 14c until the diameter D5 of the chamfer 30b is equal to the inner diameter D4 of the second opening 14c. Further, the outer diameter D6 of the forward end of the support shaft 30 is smaller than the inner diameter D4 of the second opening 14c. The chamfer 30b of the support shaft 30 is introduced into the second opening 14c by about 0.1 mm to 0.2 mm (L1 in FIG. 8), to come into contact with the contact portion 14d. While the chamfer 30b of the support shaft 30 has an angle α of about 45°, the contact portion 14d of the bearing 14a has an angle β of about 90°, to have an angular shape. The second opening 14c and the bearing insertion portion 30a are at an interval (L2 in FIG. 8) of about 0.5 mm, while the length L3 of the support shaft 30 is so adjusted that the bearing 14a and the support shaft body 30c of the support shaft 30 are also at an interval (L3 in FIG. 8) of about 0.5 mm. According to this embodiment, the support shaft 30 is positioned in this manner.

According to this embodiment, the depth L4 of the second opening 14c of the bearing 14a is larger than the axial length L5 of the chamfer 30b of the support shaft 30, as shown in FIG. 8.

As shown in FIG. 1, the wiring board 24 is fixed by tightening the four screws 28 inserted into four holes 24a of the wiring board 24 and four holes 25a of a top plate 25 to the threaded holes 1g provided on the mounting portions 1f of the chassis 1.

Figure 3:
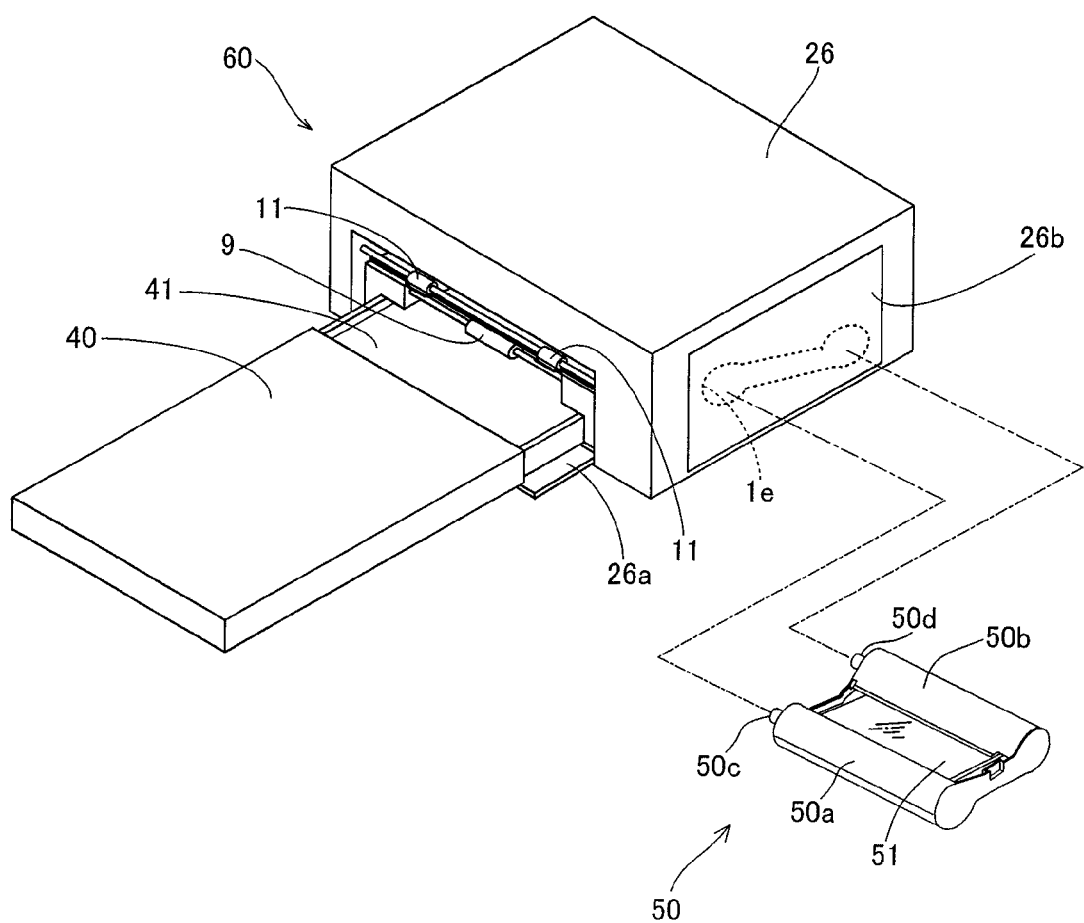
FIG. 3 is a perspective view of the sublimatic printer according to the embodiment of the present invention shown in FIG. 1.

The housing 26 includes lid members 26a and 26b, as shown in FIG. 3. The lid member 26a of the housing 26 is provided for mounting the paper feed cassette case 40 on the sublimatic printer 60. The other lid member 26b of the housing 26 is provided for mounting the ink sheet cartridge 50 on the sublimatic printer 60.

As shown in FIG. 3, the ink sheet cartridge 50 storing the ink sheet 51 has the take-up portion 50a and a supply portion 50b. The take-up bobbin 50c is rotatably held in the take-up portion 50a. A supply bobbin 50d is rotatably arranged in the supply portion 50b.

A printing operation of the sublimatic printer 60 according to this embodiment is now described with reference to FIGS. 5, 6 and 9.

First, the stepping motor 16 is so driven that the motor gear 16a mounted thereon rotates along arrow C3 in FIG. 6 and the feed roller gear 6 rotates along arrow C1 in FIG. 6 through the intermediate gears 21 and 22, as shown in FIG. 6. Thus, the feed roller 4 rotates along arrow C1 in FIG. 9. Further, the paper feed roller gear 10 and the paper feed roller 9 rotate along arrow C4 in FIG. 9 through the intermediate gears 19 and 20. Thus, each paper 41 is transported in the paper feed direction (along arrow T1 in FIG. 5). At this time, the swingable swing gear 18 is not in mesh with the gear portion 13a of the take-up reel 13, and the gear portion 13a remains unrotating. Thus, the ink sheet 51 wound on the take-up bobbin 50c and the supply bobbin 50d is not taken up in a paper feed operation.

Figure 9:
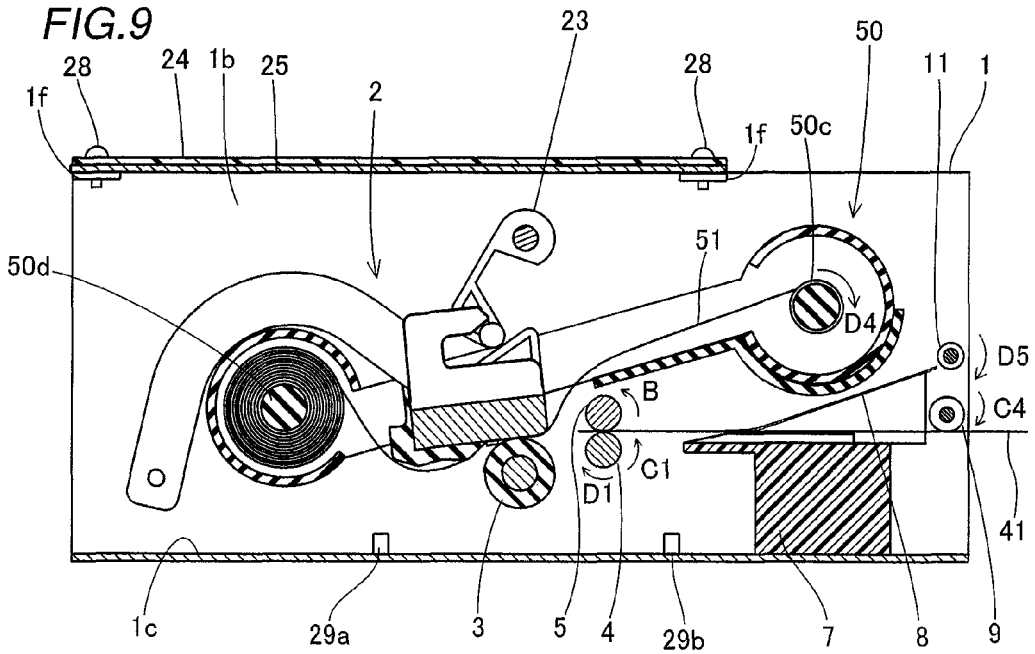
FIG. 9 is a sectional view for illustrating an operation of the sublimatic printer according to the embodiment of the present invention shown in FIG. 1.

As shown in FIG. 9, the paper sensors 29a and 29b detect the forward and rear ends of the paper 41 respectively, thereby determining whether or not the paper 41 has been transported to a printing start position. When the paper 41 reaches the printing start position, the print head 2 lowers to a printing position and starts printing.

As shown in FIG. 9, further, the stepping motor 16 (se FIG. 6) is so driven that the motor gear 16a mounted thereon rotates along arrow D3 in FIG. 6 and the feed roller gear 6 rotates along arrow D1 in FIG. 6 through the intermediate gears 21 and 22. Thus, the feed roller 4 rotates along arrow D1 in FIG. 9, and the press roller 5 rotates along arrow B in FIG. 9 following this rotation of the feed roller 4. Further, the paper discharge roller gear 12 and the paper discharge rollers 11 rotate along arrows D5 in FIGS. 6 and 9 through the intermediate gears 19 and 20 and the paper feed roller 10. Thus, the paper 41 is transported in the paper discharge direction (along arrow U1 in FIG. 5) corresponding to a printing direction. At this time, the swingable swing gear 18 (see FIG. 6) meshes with the gear portion 13a of the take-up reel 13, so that the ink sheet 51 wound on the take-up bobbin 50c engaging with the take-up reel 13 and the supply bobbin 50d is taken up on the take-up bobbin 50c.

Then, the printed paper 41 is discharged from the sublimatic printer 60. At this time, the printed paper 41 is transported along arrow U1 in FIG. 5, similarly to the operation for printing the paper 41. Then, the printed paper 41 is transported along the upper side of the upper paper guide 8, and discharged by the paper discharge rollers 11 rotating along arrow D5 in FIG. 9.

According to this embodiment, as hereinabove described, the first end 30d of the support shaft 30 rotatably supporting the intermediate gear 22 is fixedly mounted on the motor bracket 15 while the second end of the support shaft 30 includes the side end surface coming into line contact with the bearing 14a of the side plate 14 so that the side end surface provided on the second end of the support shaft 30 and the bearing 14a closely come into line contact with each other, whereby the support shaft 30 can be inhibited from backlash. Thus, the intermediate gear 22 supported by the support shaft 30 can also be inhibited from backlash, whereby the printed image can be inhibited from disorder resulting from backlash of the intermediate gear 22. Further, the side end surface and the bearing 14a are brought into contact with and fixed to each other on the second end of the support shaft 30, whereby the support shaft 30 is easily detachable dissimilarly to a case where the same is press-fitted. In addition, no member may be separately provided for inhibiting the support shaft 30 from backlash, whereby the sublimatic printer 60 can be inhibited from increase in the number of components.

According to this embodiment, the side end surface provided on the second end of the support shaft 30 has the chamfer 30b while the bearing 14a of the side plate 14 includes the contact portion 14d capable of coming into line contact with the chamfer 30b of the support shaft 30 so that the chamfer 30b of the support shaft 30 comes into line contact with the contact portion 14d of the bearing 14a, whereby the support shaft 30 can be reliably inhibited from backlash.

According to this embodiment, the second end of the support shaft 30 includes the bearing insertion portion 30a having the outer diameter D1, the chamfer 30b is provided on the forward end of the bearing insertion portion 30a, the bearing 14a of the side plate 14 includes the first opening 14b having the inner diameter D3 larger than the outer diameter D1 of the bearing insertion portion 30a and the second opening 14c having the inner diameter D4 smaller than the outer diameter D1 of the bearing insertion portion 30a and the end of the second opening 14c closer to the first opening 14b constitutes the contact portion 14d capable of coming into line contact with the chamfer 30b so that the bearing insertion portion 30a is so inserted into the second opening 14c through the first opening 14b that the chamfer 30b thereof comes into contact with the contact portion 14d constituted of the end of the second opening 14c, whereby the support shaft 30 can be easily positioned.

According to this embodiment, the depth L4 of the second opening 14c is larger than the axial length L5 of the chamfer 30b of the support shaft 30 so that the chamfer 30b of the support shaft 30 can come into contact with the contact portion 14d located on the opening end of the second opening 14c without bringing the forward end of the support shaft 30 into contact with the bottom surface of the second opening 14c when the support shaft 30 is inserted into the second opening 14c through the first opening 14b of the bearing 14a, whereby the support shaft 30 can be easily positioned.

According to this embodiment, the chamfer 30b of the support shaft 30 has the tapered shape inwardly inclined by about 45° with respect to the side surface of the support shaft 30 to be linearly formed, whereby the chamfer 30b of the support shaft 30 can be easily brought into line contact with the contact portion 14d of the bearing 14a.

According to this embodiment, the outer diameter D6 of the forward end of the bearing insertion portion 30a provided on the support shaft 30 is smaller than the inner diameter D4 of the second opening 14c so that the chamfer 30b of the support shaft 30b can come into contact with the contact portion 14d located on the opening end of the second opening 14c without bringing the forward end of the support shaft 30 into contact with the side surface of the second opening 14c when the support shaft 30 is inserted into the second opening 14c through the first opening 14b of the bearing 14a, whereby the support shaft 30 can be more easily positioned.

According to this embodiment, the contact portion 14d of the bearing 14a is provided between the first and second openings 14b and 14c, and has the angular shape. Thus, the chamfer 30b of the support shaft 30 comes into contact with the angular contact portion 14d when the support shaft 30 is mounted on the bearing 14a, whereby the chamfer 30b of the support shaft 30 and the contact portion 14d of the bearing 14a can be easily brought into line contact with each other.

According to this embodiment, the support shaft 30 further includes the support shaft body 30c and the intermediate gear 22 is rotatably fitted to the support shaft body 30c, while the end surface of the support shaft body 30c closer to the bearing insertion portion 30a and the end surface of the bearing 14a opposite to the support shaft body 30c are at the length (interval) L3 not to come into contact with each other. Thus, the end surface of the support shaft body 30c of the support shaft 30 closer to the bearing insertion portion 30a does not come into contact with the bearing 14a when the support shaft 30 is mounted on the bearing 14a, whereby the chamfer 30b of the support shaft 30 can be brought into contact with the contact portion 14d located on the opening end of the second opening 14c. Thus, the support shaft 30 can be more easily positioned.

According to this embodiment, the motor bracket 15 is made of metal, and the first end 30d of the support shaft 30 is fixedly mounted on the motor bracket 15 by caulking. Thus, the support shaft 30 can be strongly fixed to the motor bracket 15 by caulking.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment is applied to the sublimatic printer employed as an exemplary image generating apparatus, the present invention is not restricted to this but is also applicable to another image generating apparatus other than the sublimatic printer, so far as the same has a support shaft rotatably supporting a gear. The present invention is further applicable to a mounting structure for a support shaft of an apparatus other than the image generating apparatus.

While the first end of the support shaft is fixed to the motor bracket by caulking in the aforementioned embodiment, the present invention is not restricted to this but the first end of the support shaft may alternatively be fixed to the motor bracket by a method other than caulking.

What is claimed is:

1. An image generating apparatus comprising:
   a side plate, mounted on a first side surface of a chassis provided with a print portion, integrally including a bearing;
   a bracket member mounted on said side plate; and
   a support shaft arranged between said side plate and said bracket member for rotatably supporting a gear member, wherein a first end of said support shaft is fixedly mounted on said bracket member,
a second end of said support shaft includes a side end surface brought into line contact with said bearing of said side plate, the side end surface having a chamfer,
the bearing of the side plate includes a first opening, a second opening, and a contact portion capable of coming into line contact with the chamfer of the support shaft,
an end of the second opening closer to the first opening constitutes the contact portion capable of coming into line contact with the chamfer of the support shaft, and
the depth of the second opening is larger than the axial length of the chamfer of the support shaft.

2. The image generating apparatus according to claim 1, wherein
said second end of said support shaft further includes a bearing insertion portion having a prescribed outer diameter,
said chamfer is formed on the forward end of said bearing insertion portion,
the first opening has an inner diameter larger than said outer diameter of said bearing insertion portion, and
the second opening has an inner diameter smaller than said outer diameter of said bearing insertion portion.

3. The image generating apparatus according to claim 1, wherein
said bearing of said side plate is made of resin,
said support shaft is made of metal having larger rigidity than said bearing of resin, and
said support shaft of metal is mounted on said contact portion of said bearing of resin linearly in contact therewith.

4. The image generating apparatus according to claim 1, wherein
said chamfer of said support shaft has a tapered shape inwardly inclined by a prescribed angle with respect to the side surface of said support shaft.

5. The image generating apparatus according to claim 2, wherein
the outer diameter of the forward end of said bearing insertion portion provided on said support shaft is smaller than said inner diameter of said second opening.

6. The image generating apparatus according to claim 2, wherein
said contact portion of said bearing is provided between said first opening and said second opening, and has an angular shape.

7. The image generating apparatus according to claim 1, wherein
said support shaft further includes a support shaft body,
said gear member is rotatably fitted to said support shaft body, and
an end surface of said support shaft body closer to said bearing insertion portion and an end surface of said bearing opposite to said support shaft body are at a prescribed interval not to come into contact with each other.

8. The image generating apparatus according to claim 1, wherein
said bracket member is made of metal, and
said first end of said support shaft is fixedly mounted on said bracket member of metal by caulking.

9. An image generating apparatus comprising:
a side plate, mounted on a first side surface of a chassis provided with a print portion, integrally including a bearing;
a bracket member mounted on said side plate; and
a support shaft arranged between said side plate and said bracket member for rotatably supporting a gear member, wherein
a first end of said support shaft is fixedly mounted on said bracket member,
a second end of said support shaft includes a side end surface brought into line contact with said bearing of said side plate,
said side end surface provided on said second end of said support shaft has a chamfer,
said second end of said support shaft further includes a bearing insertion portion having a prescribed outer diameter while said chamfer is formed on the forward end of said bearing insertion portion,
said bearing of said side plate includes:
a contact portion capable of coming into line contact with said chamfer of said support shaft,
a first opening having an inner diameter larger than said outer diameter of said bearing insertion portion, and
a second opening having an inner diameter smaller than said outer diameter of said bearing insertion portion,
an end of said second opening closer to said first opening constitutes said contact portion capable of coming into line contact with said chamfer, and
the depth of said second opening is larger than the axial length of said chamfer of said support shaft.

10. The image generating apparatus according to claim 9, wherein
said bearing of said side plate is made of resin,
said support shaft is made of metal having larger rigidity than said bearing of resin, and
said support shaft of metal is mounted on said contact portion of said bearing of resin linearly in contact therewith.

11. The image generating apparatus according to claim 9, wherein
said chamfer of said support shaft has a tapered shape inwardly inclined by a prescribed angle with respect to the side surface of said support shaft.

12. The image generating apparatus according to claim 9, wherein
the outer diameter of the forward end of said bearing insertion portion provided on said support shaft is smaller than said inner diameter of said second opening.

13. The image generating apparatus according to claim 9, wherein
said contact portion of said bearing is provided between said first opening and said second opening, and has an angular shape.

14. The image generating apparatus according to claim 9, wherein
said support shaft further includes a support shaft body,
said gear member is rotatably fitted to said support shaft body, and
an end surface of said support shaft body closer to said bearing insertion portion and an end surface of said bearing opposite to said support shaft body are at a prescribed interval not to come into contact with each other.

15. The image generating apparatus according to claim 9, wherein
said bracket member is made of metal, and
said first end of said support shaft is fixedly mounted on said bracket member of metal by caulking.

16. A mounting structure for a support shaft, comprising:
a side plate, mounted on a first side surface of a chassis, integrally including a bearing;

a bracket member mounted on said side plate; and a support shaft arranged between said side plate and said bracket member for rotatably supporting a gear member, wherein a first end of said support shaft is fixedly mounted on said bracket member, a second end of said support shaft includes a side end surface brought into line contact with said bearing of said side plate, the side end surface having a chamfer, the bearing of the side plate includes a first opening, a second opening, and a contact portion capable of coming into line contact with the chamfer of the support shaft, an end of the second opening closer to the first opening constitutes the contact portion capable of coming into line contact with the chamfer of the support shaft, and the depth of the second opening is larger than the axial length of the chamfer of the support shaft.

* * * * *